United States Patent [19]

Shea

[11] 4,076,873
[45] Feb. 28, 1978

[54] RESORCINOL-ALDEHYDE RESINS USED TO BIND REINFORCING MATERIALS SUCH AS GLASS FIBERS IN SHAPED OBJECT FORM

[76] Inventor: Lawrence E. Shea, 165 Lake Drive, San Bruno, Calif. 94066

[21] Appl. No.: 813,338

[22] Filed: Jul. 6, 1977

Related U.S. Application Data

[60] Division of Ser. No. 691,290, Jun. 1, 1977, Pat. No. 4,053,447, which is a continuation-in-part of Ser. No. 492,881, Jul. 29, 1974, abandoned.

[51] Int. Cl.$^2$ .................. B29F 23/12; B65H 81/06; E04C 2/22; F16L 9/04; F16L 9/12; F16L 9/16
[52] U.S. Cl. .................. 428/35; 52/309.13; 52/309.16; 138/129; 138/DIG. 2; 138/DIG. 7; 156/173; 242/7.22; 264/257; 264/331; 264/DIG. 53; 428/36; 428/268; 428/290; 428/292; 428/529
[58] Field of Search ........ 242/7.22; 138/129, DIG. 2, 138/DIG. 7; 156/173; 264/257, 331, DIG. 53; 428/35, 36, 268, 290, 292, 529; 52/309.13, 309.16

[56] References Cited

U.S. PATENT DOCUMENTS 4,053,447  10/1977  Shea .................. 156/173

Primary Examiner—J.C. Cannon
Attorney, Agent, or Firm—Owen, Wickersham & Erickson

[57] ABSTRACT

A resinous product has high resistance to flame spread, good heat release and exhibits a low smoke-developed rating when exposed to flame or to indirect or radiant heat, and is flexible, tough and resistant to cracking and embrittlement upon curing. Such a product is the condensation product of resorcinol with or without included phenol, and an admixture of paraformaldehyde and furfural or furfuryl alcohol or both. The resorcinol starting material of this invention can also suitably be used in the form of a B-stage or partially cured resin of resorcinol-phenol-formaldehyde which is then condensed with the aforesaid aldehydes or such aldehyde substance and furfuryl alcohol. The product is useful in making castings or moldings which are resistant to embrittlement or cracking upon curing, and in making tough fiberglass parts, and it can contain fillers or the like. A method of making the product and articles is provided.

10 Claims, 4 Drawing Figures

RESORCINOL-ALDEHYDE RESINS USED TO BIND REINFORCING MATERIALS SUCH AS GLASS FIBERS IN SHAPED OBJECT FORM

REFERENCE TO RELATED APPLICATION

This is a division of application Ser. No. 691,290, filed June 1, 1977, now U.S. Pat. No. 4,053,447, which was a continuation-in-part of Ser. No. 492,881, filed July 29, 1974, now abandoned.

BACKGROUND OF THE INVENTION

This invention relates to a synthetic resin composition and to a method for its manufacture. The resin of this invention has good properties under high temperatures and remarkable resistance to flame, when exposed to either direct impingement of flame or to irradiated heat sources, producing little or no smoke. More particularly, this invention relates to polyhydric phenol-aldehyde resin systems.

The plastics industry has enjoyed tremendous growth for decades as new uses for plastic were found. The construction and aircraft industries, the marine industry, the transportation industry, and others, increasingly use plastics to replace metals, wood, ceramics, plasters, and other conventional construction materials. Many families of plastic resins have been used, including polyvinylchlorides, polyethylenes, polypropylenes, polyester resins, melamines, and urethanes; and the resins have been combined with various filler materials such as wood flour, walnut shell flour, glass beads, ceramics, and carbon. The filled or unfilled resins have been foamed and have been combined with glass fibers, where strength characteristics were desired. Various combinations have been used to provide different characteristics,—strength, chemical resistance, corrosion resistance, aesthetic appearance, and low cost.

However, plastics have generally had a major deficiency. Plastic resins are organic compounds, some of them hydrocarbons, which are either readily inflammable or produce large volumes of offensive smoke when subjected to heat or fire. As plastics have found their way into the construction industries, there has been growing discontent and disenchantment on the parts of fire code authorities, fire departments, insurance companies, and those who concern themselves with public safety. In May, 1973 the Federal Trade Commission spoke of possible indictment of more than two dozen large plastic resin producers for misleading the public by allegedly falsely advertising their products as fire retardant.

In prior-art practice, organic resins have sometimes been halogenated in order to increase their resistance to heat and flame. Polyvinyl chloride, for example, contains much chlorine. Certain polyester resins have also been chlorinated in order to secure resistance to high temperature and to flaming. During exposure to flame or high heat, the molecular bonds have tended to break down, releasing chlorine gas, which does function as a flame suppressant, by blanketing the available fuel of the vinyl and depriving it of oxygen. However, during the decomposition process the hydrogen in the molecular complex combines with the chlorine, forming hydrogen chloride. In the presence of moisture, whether due to high humidity (which is produced during the combustion process) or due to sprinkler systems, or due to fire fighting efforts, the resulting wet vapors of hydrochloric acid are very corrosive, eating away at building structures and other surrounding materials and producing extensive damage, while also exposing those in the vicinity of the smoke to severe potential injury. With continued combustion and exposure to high heat, the hydrogen chloride can be converted into phosgene, an exceedingly poisonous gas.

Polyester resins sometimes utilize antimony oxides, antimony tri-oxides, boron compounds, or derivatives therefrom, as a snuffing agent, however, the greater the amount of additives used to improve flame resistance, the larger the quantity of smoke that is generated.

Various resins, such as melamines, polyesters, vinyls, epoxies, and urethanes, may also be filled with inert materials, such as clays, cements (e.g., alumina [aluminum hydroxide] and derivatives), asbestos, and mica, to reduce the quantity of resinous fuel available for combustion. Loadings of inert fillers often exceed 50%. High loading of inert filler materials, especially when used with halogenated resins and in combination with snuffing compounds, have been claimed to produce end products which are fire retardant. However, in actual field experience such claims have generally been shown to be illfounded and unsupported by results.

Field experience has shown that smoke generation is as important, or more important than, intense flaming because smoke generation of plastics and attendant problems have been very serious in fires in high-rise buildings and in aircraft, for instance. Such generated smoke has made it impossible for persons to find escape exits and has resulted in suffocation and death, while impeding the work of firefighters.

Almost four-dozen tests have been used to determine flammability characteristics of plastics, but many of these have proven inadequate or even misleading and only a small handful concern determination of the smoke-generating characteristics. One of these is the ASTM E84 test, known generally as the Steiner "Tunnel Test," and described in "Standard Method of Test for Surface Burning Characteristics of Building Materials . . . UL 723." A twenty-inch wide by 25 foot long cement asbestos board is placed on top of a U-shaped furnace 25 feet long and exposed to flame. The results are calibrated to equal zero. Then a piece of red oak wood, 20-inches wide by 25 feet long replaces the cement-asbestos board on the roof of a furnace, and the wood is ignited at one end by a gas burner. The time it takes for the wood to ignite and burn the length of the furnace is the "flame spread" and is used as a reference of number 100. The amount of smoke generated is measured by a photocell and plotted on a chart, the area under the developed curve being used to determine the total quantity of smoke generated. Conventional plastics when so tested under standardized conditions have flame spreads which range from 10 to 1500, and their smoke developed ratings ranging from 200 to 2000. Experience has indicated generally that the lower the flame spread, the higher is the smoke developed rating, progressing almost geometrically and inversely to the higher numbers.

A second test used to determine fire characteristics of materials is the Monsanto "small scale tunnel test." Instead of using a 25-foot-long test sample, the Monsanto test uses a 2-foot-long sample. It is generally conceded that the results obtained from the Monsanto tunnel test may be used to predict flame spread numbers that would be received in the "full scale" ASTM E84 Steiner tunnel test.

A third test to determine fire characteristics of materials is that developed by the National Bureau of Standards. It has been proposed for use by the ASTM, and is identified as the "E-5" test. The national Bureau of Standards test determines results both with direct flame impingement and indirect heat irradiation. During both tests (known as "flaming" and "non-flaming") the amount of smoke generated is monitored and plotted against time. It has been found that certain materials generate very large quantities of smoke with flame impingement and little or no smoke during the non-flaming test; conversely, other materials produce little or no smoke during the flaming test, but generated large quantities of smoke during the non-flaming test. Test results of over 100 materials are contained in the National Bureau of Standards Building Science Series Bulletin No. 18.

A fourth test useful in determining the flame and smoke characteristics of materials is in use at Ohio State University. This test was developed in recent years by Professor Edwin Smith. A test sample of less than one square foot is inserted into a test chamber and exposed to flame. It is found that materials which contain high amounts of anti-flaming compounds often generate large volumes of dense smoke.

While there appears to be no correlation between these four tests (except between the Steiner tunnel and Monsanto tests), any of these tests may be used to exhibit fire response characteristics of plastic materials: the rapidity with which flame will spread along the material's surface (the heat release rates), and the amount of smoke that will be generated by materials when exposed to a heat source.

A further problem met with plastics materials relates to their degradation when exposed to heat. Generally, thermoplastics such as polyethylene and polyvinyl chloride start to deform physically at temperatures that vary from 140° to 220° F. These materials may not therefore be utilized where high ambient temperatures are the normal operating condition. Thermosetting plastics, such as common polyesters, begin to degrade in the vicinity of 300° to 400° F. Phenolics, in combination with other materials, may remain physically stable to upwards of 500° F. All these materials are relatively low in cost and are readily available on the market; but all of them have very bad smoke-generating characteristics. Certain families of materials such as polyamide-imides, when properly laminated and cured, exhibit favorable fire-resisting characteristics in terms of high temperature resistance (900° F.) with little or no smoke generation; however, these raw resin materials are expensive, and polyimides are expensive to fabricate.

While aldehyde resin systems of phenol and resorcinol have been known to possess high temperature strength, they have not traditionally been used in combination with fiberglass. Phenol-aldehydes, resorcinol-aldehydes, and phenol-resorcinol-aldehydes link through a condensation reaction. During the condensation, large quantities of water are given off. Roughly, for every mol of phenol, a mol of water is given off. This tends to create voids in fiberglass laminates not made under high pressure and temperature conditions. A number of other problems are posed in the application of these resin systems with fiberglass. Phenol resin systems have not tended to bond well to glass. Glass fibers are usually treated with salts and chemicals such as coupling agents which make the glass more flexible and improve the bonding of the glass fibers to resins.

The water of a phenol-aldehyde condensation reaction tends to react with these salts or coupling agents on the glass fibers, causing degradation and embrittlement of the glass and interferring with the coupling agents in common use. Yet it is often desirable to use fiberglass in order to achieve strength and durability. It is also desirable to be able to mold fiberglass parts without the necessity of curing the parts at high temperatures and pressures.

OBJECTS OF THE INVENTION

One object of this invention is to provide a synthetic resin system which has high resistance when exposed to flame and consequently a good "flame spread or heat release rating."

Another object of the invention is to provide a synthetic resin composition which, when exposed to a source of radiant (or indirect) heat, has little tendency toward flaming.

Another object is to provide a synthetic resin system that generates little or no smoke when exposed to a direct flame-impingement condition.

A further object is to provide a synthetic resin composition that provides little or no smoke when exposed to an indirect heat irradiation source.

Other objects of the invention are to provide a product which: resists deformation when exposed to high temperatures, has good "flame spread ratings" when exposed to a direct flaming source or when exposed to an indirect source of heat irradiation, exhibits good heat release, and has a low smoke developed or smoke density rating when exposed to a flaming source or a source of radiant heat.

Additional objects of the invention are to provide a product that: has high strength, cures at room temperature, is low in cost, has a long shelf life, and is safe and easy to handle.

A further object of the invention is to provide a method of producing fire-resistant articles.

Another object is to provide a synthetic resin product of resin in combination with fiberglass which can be cured at ambient or room temperature and pressures.

A further object is to provide a filament wound product in combination with the synthetic resin composition of the invention.

SUMMARY OF THE INVENTION

I have discovered that the condensation products of resorcinol (with or without phenol as a diluent) with furfural and paraformaldehyde or with furfuryl alcohol and paraformaldehyde, or with all three of these latter compounds, are exceptionally fire-resistant and exceptionally low in tendency to produce smoke. The resorcinol can be employed as starting material herein in the form of a partially cured or B-stage resin of phenol-resorcinol-formaldehyde. One example of such resin contains or is made from a mixture of 15–40 parts by weight phenol, 10–25 parts by weight resorcinol, and 15–35 parts by weight aqueous formaldehyde solution; i.e. formalin. The new material of this invention may be used in combination with fiberglass and other materials to make better structural materials.

Resorcinol or a combination or an admixture of phenol and resorcinol may be reacted in the absence of a catalyst with various aldehydes. However, not all such reaction products are satisfactory for the purposes of this invention. For example, phenol cannot be used successfully commercially in combination with formaldehyde except where formed under high pressures and high temperatures. Formaldehyde and formalin produce water in the condensation reaction of phenol with formaldehyde or formalin, and there is additional water already contained in the formaldehyde or formalin. This water has to be dissipated by venting or must be locked into the chemical structure; from this arises the need for heat and pressure.

Acetaldehyde is not stable and is considered dangerous to use in an ordinary fiberglass fabricating shop. Most other sources of aldehydes present problems of handling and use without the aid of specialized equipment and processes.

Paraformaldehyde, a polymer of formaldehyde, sometimes called polyoxymethylene, preferably in the form of a fine powder, is one preferred source of aldehyde because of its low water content, its high molecular weight, its being a rich source of methylene, and its relatively easy solubility in resorcinol. Paraformaldehyde in amounts up to 20% when used by itself as the sole aldehyde, may be used to react with resorcinols and phenol-resorcinols in the absence of high temperature and pressure to produce a product with high temperature resistance and little or no smoke evolution during flaming or irradiated conditions. However, when used as the sole source of aldehyde, paraformaldehyde presents some practical drawbacks. First, it is considered poisonous and if not handled properly, exposes shop workers to a serious toxicological hazard to their health. In addition, paraformaldehyde, when used in higher amounts as the sole aldehyde, tends to produce a brittle product, which tends to crack and craze, possibly because of a surplusage of methylene or possibly because large voids are created during the dissipation of the water from the condensation reaction, either of these possible causes possibly causing the molecules to become too tightly linked. The end product is then weak and brittle, whether the resin is used as a plain unfilled casting, or used in combination with reinforcing fiberglass, wood flour, or other commonly used fillers. The tendency toward cracking is somewhat reduced, of course, by the use of fillers since less resin is used.

Furfuraldehyde may also be used, e.g., in amounts up to 30%, as the sole aldehyde with resorcinol or a phenol-resorcinol mixture in the absence of heat and pressure to form fire-resistive products. The end product of this reaction has desirable high temperature resistance and adequate strength and provides a more flexible product. However, it does not have desirable flame-spread resistance, it burns more readily, has a higher flame-spread rating and generates more smoke than does the resin made from paraformaldehyde as the sole aldehyde.

I have found that either furfural or furfuryl alcohol, or both, may be used in admixture with or along with paraformaldehyde to react with resorcinol or phenol-resorcinol to provide a degree of flexibility to the resin system not secured when paraformaldehyde is added alone. The combination produces a tough, essentially non-burning, non-smoking synthetic resin, either alone as a casting, or in combination with fiberglass or other fillers. I have found that both furfural and furfuryl alcohol when used (together or separately) with paraformaldehyde function as a flexibilizer or plasticizer in the resorcinol or phenol-resorcinol condensation product to enable the fabrication of fire-resistive products utilizing fiberglass and other filler materials. In the case of the furfural-paraformaldehyde combination, I have found that in a preferred embodiment as one varies the percentage of paraformaldehyde from a small amount, e.g., about 2%, up to about 15%, one may inversely vary the percentage of furfural from about 30% to a small amount, e.g., about 5%; and that the paraformaldehyde should always be not over about 50% of the amount of furfuraldehyde, where the latter is used.

The use of furfuryl alcohol-paraformaldehyde and/or furfural-paraformaldehyde provides a tough fiberglass laminate with high temperature resistance, high resistance to flame-spread and low smoke-generation, and forms a flexible synthetic resin composition which produces rigid parts when used in conjunction with fiberglass, with or without the use of inert fillers.

The percentage ratios provided above relate to the weights of various components. Resorcinol and phenol-resorcinol are solids which, to enable them to be used in liquid form, are dissolved in various diluents or solvents, such as alcohols, ether, water, or glycol. Consideration must be given to the percent solids of the resorcinol and phenol-resorcinol and to the mol weights used. These materials (herein called part A) provide the sole or major source of the hydroxy radical which may be condensed with the aldehyde radical in what is herein called part B. Where furfuryl alcohol is used, this compound provides some hydroxyl radicals. The percent solids used within the resin, part A, is a variable in and of itself. The resorcinol, whether or not extended with phenol, may vary in composition: for example, it may vary from about 8% to about 15% weight content of free phenol-radicals in solution. The proportion of phenol per se to resorcinol may also be adjusted from about 1% to about 30%, based on the weight of these two components. Because of these variables, the corresponding weight of the aldehyde source is widely variable as the proportions of resorcinol, phenol, and phenol-resorcinol are changed. Sufficient aldehydes or B-components are used to provide a flexible, tough resin of low flame-spread and smoke-evolution characteristics when compared with red oak wood, and with satisfactory resistance to cracking and embrittlement. "Flexibility" as used herein refers to molecular flexibility or the quality of non-brittleness in the final product.

BRIEF DESCRIPTION OF THE DRAWINGS

The advantages of the invention are shown in the attached drawings wherein.

DETAILED DESCRIPTION OF SOME PREFERRED EMBODIMENTS

The discussion which follows is based on a resorcinol or phenol-resorcinol base of about 10% solids in solution in a suitable solvent, typically water and methanol. If 15% solids is used, all values for the aldehydes would correspondingly increase 50%. Further adjustment in aldehydes is dependent on the total weight of the source of the hydroxy radical.

With the resorcinol or phenol-resorcinol component considered part A, and the aldehyde source considered component B, be it paraformaldehyde plus furfuryl alcohol or paraformaldehyde plus furfural, then for every 100 parts of A by weight, part B may be varied from about 8 parts to about 40 parts by weight.

As stated, when the source of aldehyde is a combination of furfural and paraformaldehyde, the ratio of B to A may be as high as 40 to 100 by weight, or 40% B, based on the weight of A. In addition, the internal composition of B must be varied on an inverse ratio, with B consisting of a maximum of 15 parts of paraformaldehyde and 30 parts of furfural. For example, one may use 33 parts of B to 100 parts of A, with B consisting of 11 parts of paraformaldehyde and 22 parts of furfural or one may use 15 parts of B to 100 parts of A, with B consisting of 12 parts of furfural and 3 parts of paraformaldehyde.

I have discovered that when the formulation contains less than 2% by weight of A of paraformaldehyde, the end product (be it a resin casting alone or resin in combination with fiberglass or other fillers) has undesirable smoke-generating characteristics.

By "undesirable" is meant here that the end product has a smoke-developed rating in excess of 50 as determined by the ASTM E84 Tunnel Test.

I have found that no cements, fillers, halogens, antimony oxides, borons, chlorines or other common and conventionally used fire-resistive additives are necessary to achieve the results obtained by this invention. It is particularly important to note that no cement of any kind is required to influence either the viscosity of the resin system, nor to improve glass wet-out, nor to absorb water generated during the condensation reaction, nor to impart any of the desired fire-resisting, low smoke-generation, and strength characteristics. While all such materials of the above may be added to the instant invention, they do not significantly influence the instant invention, and some may have deleterious effects and/or influences on the use of this synthetic resin composition, most of which have been discussed earlier.

The presence of fibrous materials, fillers, and reinforcing fiberglass help to reduce the shrinkage effect of the resin, and can help to prevent cracking or crazing of the cast resin.

Paraformaldehyde is commercially available in combination with wood flour. A small percentage of this combination is not disastrous in the instant invention; however it is preferable to use paraformaldehyde without wood flour, in order to avoid unwanted water and in order to reduce smoke generation.

The synthetic resin composition of the instant invention may be used to produce end products such as honeycomb structures for aircraft (either of the coated paper or fiberglass types), panels (whether for aircraft or residences), air ducts, electrical conduits, fire doors, fire-resistant coatings, piping, and other materials used in the construction, aircraft, transportation, marine and other fields. Conventional fiberglass fabricating equipment and/or techniques may be used in conjunction with the instant invention, to achieve any of the above products. The resin system alone or in combination with conventional non-burnable filler materials, or in combination with fiberglass mat, woven roving, chopper glass roving or filament winding roving, may be used to provide finished end products.

Conventional chopper or spray guns may be employed for spraying a mixture of chopped glass fibers and the resin of this invention onto flat surfaces, rotating pipes, or other configurations. The resin systems of this invention will cure at room temperature, in time becoming firm. The curing of the fiberglass and resin mixture, while occurring at normal ambient air temperatures, may be further accelerated by a source of external heat. Once the parts are cured, they may be removed from their molds and will thereafter retain their shapes. Additionally, known accelerators to effect rapid cure may be added to the resin.

The material in combination with filament-winding roving may be used to wind round, oval or rectangular shapes for use as ducts, conduit, pipes or tanks. In this instance, a rotating form is used, and the glass roving wound; alternatively, the form may remain stationary, and the bobbins of glass be rotated around the form or mold. Prior to winding the roving, the winding roving is immersed in a coater or impregnator unit to wet the glass strands with the resin composition. This technique may also be used to make round, oval or rectangular elbows, tees, flanges or containers of virtually any shape or size within the capability of the individual filament winder used.

The synthetic resin composition of this invention employing paraformaldehyde and furfural is ideally suited for use with automatic fiberglass spray equipment and may be sprayed on the interior and/or exterior of revolving steel pipes, or synthetic composition pipes. When sprayed on the interior, the process is known as centrifugal casting, and when sprayed on the exterior, the process is known as coating.

Conventional and continuous pultrusion and extrusion equipment may be used for the continuous production of pipes, ducts, gutters or any shape limited only by the dies used.

Molding equipment, such as either hydraulic presses or low-pressure vacuum bags, may also be used to manufacture products using the resin system of the instant invention.

Coatings of this invention, filled or unfilled, may also be used for roofing, pipe insulation, duct insulation, and wall surfaces.

It is also feasible to foam the resins of this invention to produce a fire-resistant foam. Conventional Freon or other suitable gases may be used to form products of various densities, depending upon the gas and the types and quantities of fillers used.

The synthetic resin composition of this invention employing a combination of furfural and paraformaldehyde is ideally suited for use with automatic fiberglass spray equipment. If paraformaldehyde, a dry powder, is the sole aldehyde used, it is difficult to proportion and mix with the liquid solution of resorcinol or phenol-resorcinol in organic solvent. Generally, spray-mixing equipment requires that the two components A and B be proportioned and mixed together at a spray nozzle. Paraformaldehyde and resorcinol or resorcinol-phenol must first be mixed and then transported through a tube to a modified chopper gun. If, for any reason, the operation of the chopper gun is stopped, the premixed resin reacts within the tube, thus clogging the equipment and making such an application impractical. However, in a preferred embodiment of the instant invention the paraformaldehyde may first be mixed with the furfural. By constant agitation of this component B, a liquid system is available for use with a slightly modified but conventional chopper gun. The mixing of the A component with the B component occurs as it exits from the spray nozzles of the chopper gun, and no undue problems occur in the supply tubes to the gun.

The paraformaldehyde may be mixed with the furfural at a separate facility form the normal operating fiberglass shop purposely constructed to remove the hazards to workmen that occur when handling loose paraformaldehyde powder.

When the synthetic compositions of this instant invention are used in combination with fiberglass, the resulting laminate has a temperature resistance that varies from about 800° to over 1500° F., depending upon the techniques used to fabricate the end product.

While I do not wish to be bound to any specific theory, I believe that resorcinol and paraformaldehyde are the basic ingredients which provide the desirable flame and heat resistivity and low smoke, and other desired end results. I believe that, essentially, the hydroxy groups of the resorcinol combine with the paraformaldehyde in such a manner that the unusual combination of resistance to flame spread and low smoke-generation are achieved. The combination of phenol with resorcinol does not interfere with the desirable end characteristics. I believe that furfuryl alcohol and/or furfural are necessary to provide flexibility in the resin structure and prevent brittleness and cracking, and that when proper proportions of these aldehyde components are used in conjunction with the resorcinol or phenol-resorcinol mixture, the desired end characteristics of strength, elimination of cracking and crazing, high temperature resistance, reduced flame spread and low smoke-generated values are all achieved. Most important, from a practical point of view, the viscosity of the instant invention enhances the fabrication of fiberglass parts because of my new resin's superior ability to wet and bond to glass fibers, without the application of pressure and without the necessity of heat. However, pressure and heat may be used to reduce the reaction and cure time required, which tend to tie-up the tooling.

Thompson in U.S. Pat. No. 3,502,610 teaches that Portland cement, within a narrow range, especially Trinity white Portland cement, is required to enable fabrication of fiberglass parts with resorcinol-bearing resins and to achieve fire resistance. I have found that such cements are not required either to influence viscosity, to achieve glass wetout, to achieve desired fire-resistant properties, or to achieve strength retention of fiberglass parts.

Novotny in U.S. Pat. No. 1,802,390, prepares resins from a batch, for instance, comprising phenol-resorcinol-furfural and paraformaldehyde, but in proportions which are quite different from those of the present invention. Novotny's resins are useful in moldings, and he does not show structural parts or any flammability or smoke development properties or objectives. As will be demonstrated by examples shown below, the Novotny resins do not possess the characteristics of the resins of the present invention.

EXAMPLE 1

Samples of various resins were prepared, to include as (A) component, partially cured phenol-resorcinol-formaldehyde resin and as (B) component, paraformaldehyde, or paraformaldehyde and furfural; and in some instances cement as filler, as follows:

TABLE I

| Test No. | Part A Parts by weight Phenol-Resorcinol | Parts by Wt. Formalin | Part B Parts by Weight | | Cement | Filler |
|---|---|---|---|---|---|---|
| | | | Paraformaldehyde | Furfuraldehyde | | |
| a 1 | 2.6 | 12.6 | * | 12 | 0 | 3 | 0 |
| 2 | 2.6 | 12.6 | * | 12 | 0 | 0 | 0 |
| 3 | 2.6 | 12.6 | * | 12 | 0 | 0 | 3 |
| b 1 | 26 | 16 | 15–35 | 15 | 0 | 0 | 0 |
| 2 | 26 | 16 | 15–35 | 12 | 0 | 0 | 0 |
| 3 | 26 | 16 | 15–35 | 12 | 0 | 0 | 3 |
| c 1 | 1.8 | 8.3 | * | 15 | 0 | 0 | 0 |
| 2 | 1.8 | 8.3 | * | 12 | 0 | 0 | 0 |
| 3 | 1.8 | 8.3 | * | 12 | 0 | 0 | 3 |
| d 1 | 26 | 16 | 15–35 | 3 | 12 | 0 | 10 |
| 2 | 26 | 16 | 15–35 | 3 | 12 | 0 | 0 |
| 3 | 26 | 16 | 15–35 | 3 | 12 | 0 | 1.5 |
| e 1 | 2.6 | 12.6 | * | 0 | 0 | None | |
| 2 | 2.6 | 12.6 | * | 0 | 20 | | |
| 3 | 2.6 | 12.6 | * | 0 | 30 | | |
| f 1 | 26 | 16 | 15–35 | 0 | 10 | None | |
| 2 | 26 | 16 | 15–35 | 0 | 20 | | |
| 3 | 26 | 16 | 15–35 | 0 | 30 | | |
| g 1 | 1.8 | 8.3 | * | 0 | 10 | None | |
| 2 | 1.8 | 8.3 | * | 0 | 20 | | |
| 3 | 1.8 | 8.3 | * | 0 | 30 | | |

*These are commercially available PRF formulations. Percent or parts formaldehyde not known.

Each of the preceding formulations were used to saturate fiberglass to make laminates ⅛th-inch thick. Preliminary testing indicated that, after each was cured at 200° F. for 1 hour, samples e, f, and g series, while having high heat resistance and moderate flaming and smoke properties compared to conventional resins available, did not perform as favorably as the a, b, c, and d series.

All laminates were stiff and tough similar to polyester and epoxy fiberglass laminates. Samples a, b, c, and d were sent to Monsanto Research Laboratories in St. Louis, Mo. for test in their 2-foot tunnel.

Results of tests are contained in Table II. The flame-spread values have been adjusted by formula to equate to values similar to that used in the E84 test previously described, where red oak wood would have a flame-spread value of 100.

The smoke values, however, were determined by the National Bureau of Standards test, and they have been adjusted so that red oak wood, instead of having a value of 100 as in the E84 test, would have a value of 117. The smoke values shown in Table II, therefore, are adjusted values of what one might anticipate by extrapolation from the E84 test. The predictability of results in the full scale tunnel by the Monsanto tunnel is sufficiently well documented as to be generally accepted. To meet various codes, it is desirable that flame spread not exceed 25 and smoke density not exceed 50.

TABLE II

| COMPARISON ANALYSIS, MONSANTO DATA | | |
|---|---|---|
| Test | Flame Spread* | Smoke Density* |
| a 1 | 10.3 | 29 |
| 2 | 8.5 | 45 |
| 3 | 8.5 | 37 |
| b 1 | 14.9 | 30 |
| 2 | 11.2 | 35 |
| 3 | 13.1 | 46 |
| c 1 | —** | 52 |
| 2 | 6.4 | 83 |
| 3 | 6.4 | 63 |
| d 1 | 11.2 | 32 |
| 2 | 15.8 | 20 |
| 3 | 10.2 | 31 |

*Interpolated Values.
**Note: cl value erratic and not reported

It may be noted that equivalent flame spread (or resistance to burning) are all well below 25, which is desired, and the *d* formulations easily exceed the requirements. Also, all of the *d* formulations exhibited smoke development equivalent of not over 32, where 50 is the maximum allowable, and they average lower than the other mixes, even with fillers. In addition, the list samples *d* remain strong and free of cracks and crazing.

EXAMPLE 1A

Samples were prepared 20-inches wide and 25-feet long using Formulas *a*1 and *d*2; subsequently each was sent to Southwest Research Institute for the E84 Tunnel Test. Results are as follows:

TABLE III

| Test | Flame Spread | Smoke Density |
|---|---|---|
| a 1 | 10 | 45 |
| d 2 | 5 | 15 |

There is no real correlation on the smoke test between the National Bureau of Standards test and the ASTM.E84 tunnel test; nonetheless, as extrapolated value for a smoke-development number of 50 (the maximum desired by ASTM E84 and most codes) shows that the *d* mixes averaged lower than the others. That is, laminates (1*d*), (2*d*), and (3*d*), using a combination of aldehydes averaged the lowest smoke evolution of all.

EXAMPLE 2

Twelve laminates, as previously described, were made using formulas *a*: 1, 2, and 3; *b*: 1, 2, and 3; and *d*: 1, 2, and 3. These laminates were sent to Ohio State University Experiment Test Station for the Smith test for flammability and smoke. The results of each group were summarized for the sake of simplicity. These tests have no correlation to any of the other tests mentioned above, but the results may be compared from laminate to laminate as indicative of fire performance. The results of the Ohio State University tests indicate the following order of magnitude, from lowest to highest:

TABLE IV

| Heat release | d - c - b - a |
|---|---|
| Smoke release | c - d - a - b |

Full scale tunnel tests (ASTM E84) have indicated that fiberglass panels combined with the Thompson resin formulation (samples *a*-1 above) had a flame spread of 10 and a smoke developed rating of 45. The *d* mixes herein had good heat release results, and had some higher filler contents than the *c* mixes but with low smoke results. The Thompson panels had the highest average heat release rate (1147 Btu per sq. ft. vs 933 for the *b* panels and only 427 for the *d* panels), and the Thompson (*a*-1 panels) were not significantly superior in smoke evolution (average 508 p.p.m./sq. ft., 560 for the *b* panels, and only 220 for the *d* panels).

TABLE IV

| COMPARISON ANALYSIS OF OHIO STATE TESTS | | | |
|---|---|---|---|
| | Total Heat Release (Red Oak Value = 2800) | | |
| Test | 1 | 2 | 3 |
| a | 1200 | 1050 | 1000 |
| b | 1050 | 700 | 1050 |
| c | no data | no data | 700 |
| d | 650 | no data | 500 |
| | Smoke Development (Red Oak Value = 425) | | |
| a | 400 | 440 | 685 |
| b | 925 | 575 | 180 |
| c | no data | 170 | no data |

TABLE IV-continued

| COMPARISON ANALYSIS OF OHIO STATE TESTS | | | |
|---|---|---|---|
| d | 360 | 180 | 120 |

EXAMPLE 3

Laminates were also prepared using the same components of phenol-resorcinol-furfural and paraformaldehyde as cited in Novotony Example 5 except with ratios as follows:

| | BN1 | BN2 | BN3 | BN4 |
|---|---|---|---|---|
| Phenol | 70 | 70 | 100 | 100 |
| Furfural | 100 | 100 | 100 | 100 |
| Paraformaldehyde | | | | |
| Resorcin | Equimolecular weights within the limits cited. | | | |

Further laminates were prepared essentially based on Novotony Example 2, with variations into Example 5 as follows:

| | CN1 | CN3 | CN4 | CN5 | CN6 |
|---|---|---|---|---|---|
| Phenol | 70 | 70 | 70 | 70 | 70 |
| Furfural | 100 | 100 | 100 | 100 | 100 |
| Resorcinol | 47 | 47 | 55.6 | 72.6 | 52.4 |
| Paraformaldehyde | 0 | 21 | 2.3 | 7.0 | 27.1 |

Formulations BN and CN were used to construct approximately ⅛th-inch thick fiberglass laminates and cured according to the directions as cited by Novotony. (The *a*, *b*, *c*, and *d* formulations were also approximately ⅛th-inch thick as previously described). These were tested for smoke density and heat release or flame spread as described in Example 1.

Figure 1:
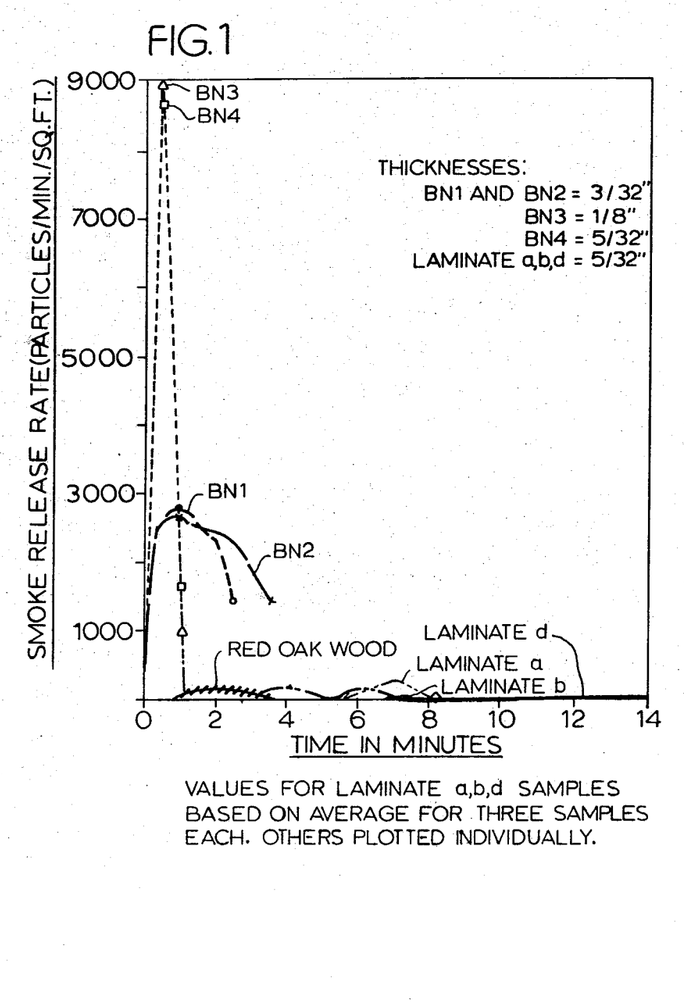
FIGS. 1 and 2 are charts showing the comparative results obtained (each as an average of three tests) in smoke development tests.
Figure 3:
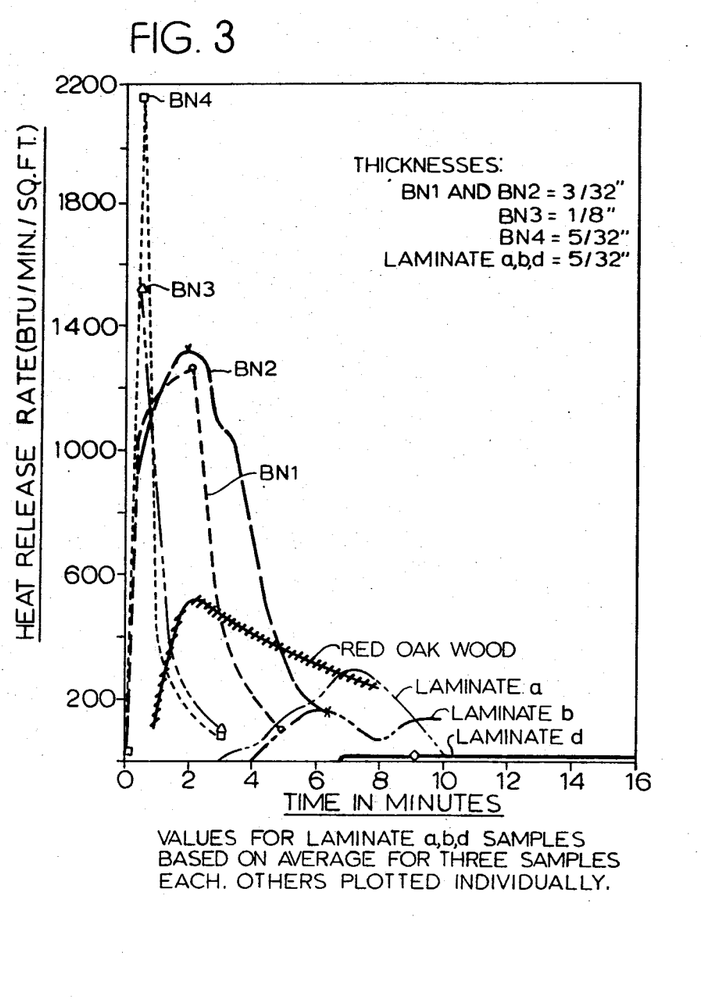
FIGS. 3 and 4 are charts showing the comparative results obtained (each as an average of three tests) in heat release tests.

The results of the smoke development tests on the BN series are shown in FIG. 1, and heat release tests in FIG. 3, along with the curves representing the values resulting from red oak wood used in the tunnel tests previously described. As may be seen, any of the Novotony formulations produce results which far exceed the values considered desirable by code officials which would be one-quarter of that shown for flame and one-half of that shown for smoke values on the red oak wood.

Figure 2:
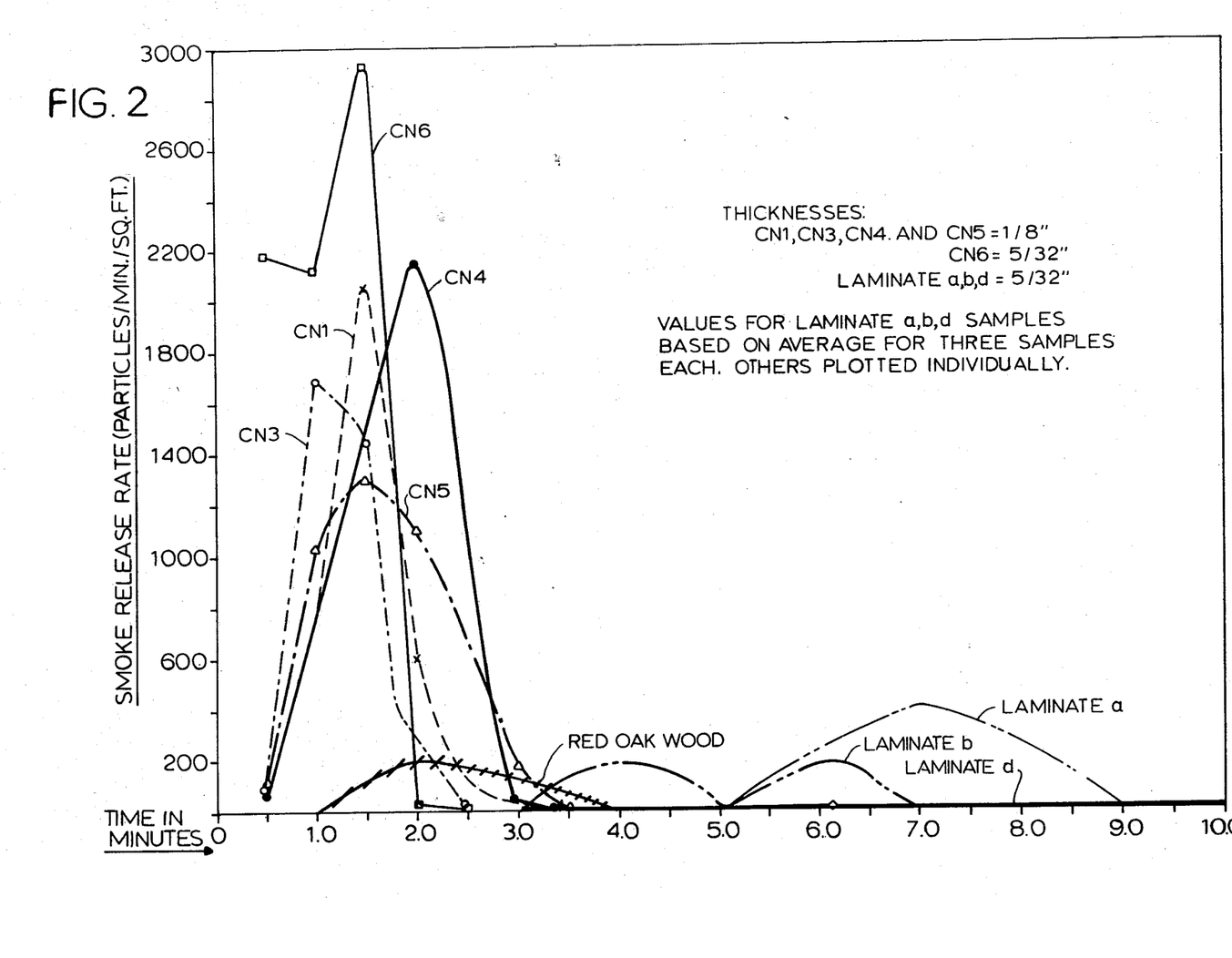
Figure 4:
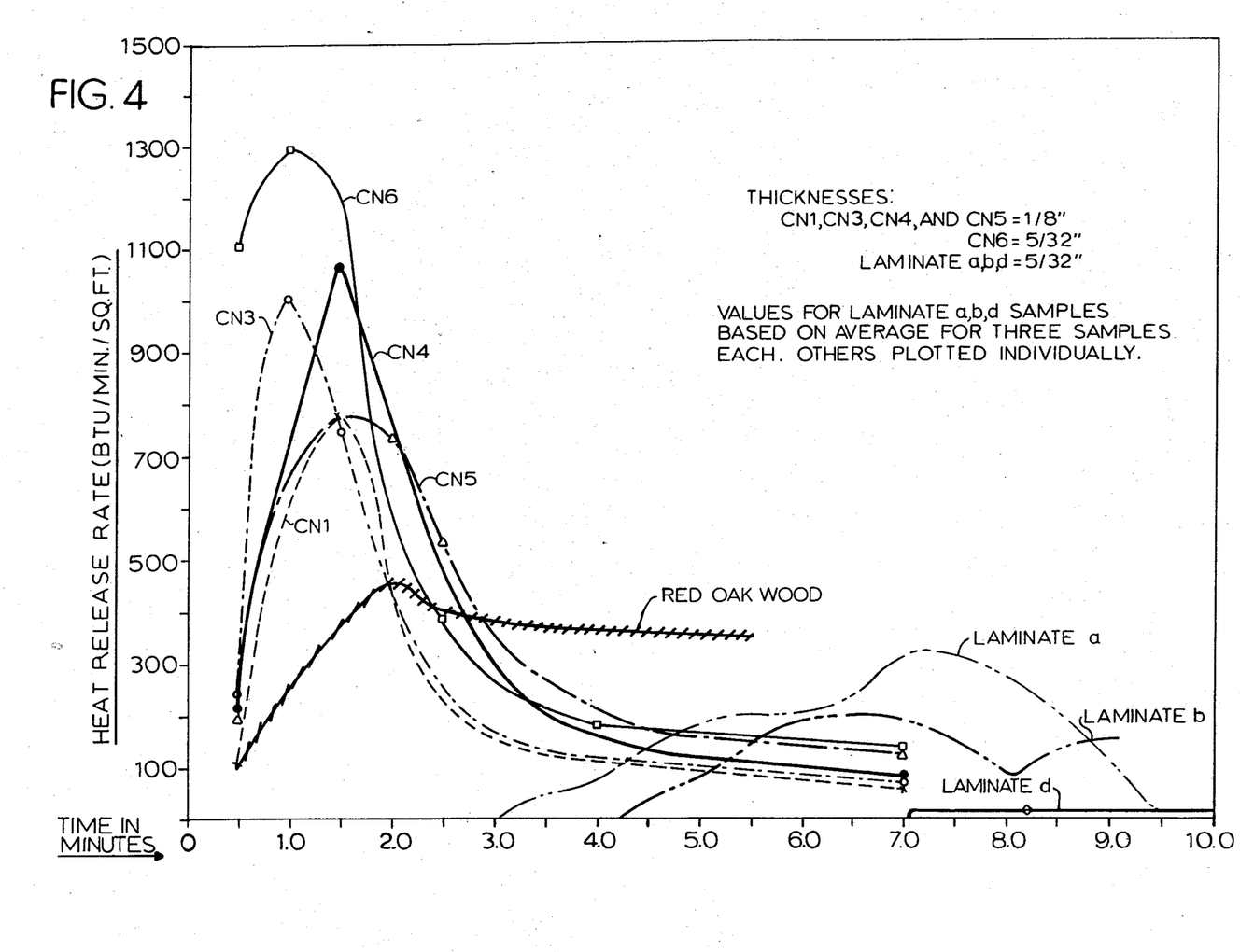

The results of the smoke development tests and the heat release tests on series CN are shown, respectively, in FIGS. 2 and 4.

In each Figure, comparative test results on red oak wood and on ⅛-inch thick fiberglass laminates a, b and *d*, *d* being made according to the present invention, are also shown in the curves marked, respectively, Red Oak Wood, Laminate *a*, Laminate *b* and Laminate *d*. Laminate *d* results demonstrate the superiority of the products of this invention.

EXAMPLE 4

A 10-inch diameter duct was fabricated from glass fiber roving using formula *d* above by the filament winding process. An acetylene torch was applied to the cured duct. There was no flame or smoke; the torch burned a hole in the duct by melting the glass.

EXAMPLE 5

A resin casting similar to formulations in Example 1 were made using no filler or reinforcing materials (except for cements in Samples *a*). Samples *b* and *c* commenced to crack and disintegrate in a few days; Sample

*a* in a few weeks. Sample *d* had the greatest stability with the least cracks and crazes developing over a 2-month period. When a propane torch was applied to the samples, for all practical purposes none of them burned nor smoked. Rather, they gave off an invisible gas which often extinguishes the flame of the propane torch. I theorize that $CO_2$ is probably given off during combustion, and that the $CO_2$ functions to deprive the surface of oxygen. In addition, the heat from a flame tends only to char the surface. This char reradiates the majority of the heat flux input, thereby reducing the temperature of the surrounding area. These phenomena are also displayed with fiberglass laminates. Even when a ⅛th-inch thick laminate is cherry red on the opposite side from the flame impingement, the panel remains cool to the touch a short distance away from the flame.

EXAMPLE 6

Honeycomb panels one-half-inch thick of both fiberglass and kraft paper were fabricated using the combination of aldehydes of the present invention with no cement. Parts were oven-cured. A propane torch applied to the panels produced no flame or smoke.

EXAMPLE 7

Laminates of a single layer of 180 and 120 glass cloth were prepared using 30 parts of B to 100 parts of A; the B consisting of 12% furfural and 3% paraformaldehyde. A National Bureau of Standards chamber test was conducted for smoke evolution. The maximum smoke was 6, virtually no smoke at all.

EXAMPLE 8

A 40-inch diameter duct elbow was filament wound from glassfiber roving using 100 parts of A and 33 parts of B, the B portion consisting of two-thirds furfural and one-third paraformaldehyde. The part is tough and strong. When an acetylene torch is applied no flaming or smoking occur.

TABLE VI

|  | Example 9 | Example 10 | Example 11 |
|---|---|---|---|
| % furfural | 13.8 | 13.8 | 14.7 |
| % Para | 8.1 | 7.8 | 11.5 |

Fiberglass laminates were made with the above. The percent were used in relation to part A, a commercially available phenol-resorcinol. When a propane torch was applied to the laminates they did not burn or smoke. They were, however, brittle and cracked easily. I have further discovered that in the combination of furfural and paraformaldehyde, the latter must always be not over 50% of the former.

EXAMPLE 12- f, g, and h

Resins as in *b, c,* and *d* above, respectively, were modified by mixing with 10% furfuryl alcohol and combined with 8% paraformaldehyde. Acceptable laminates were achieved which, for all practical purposes did not burn or smoke.

In a further series of tests according to the invention, 100 parts by weight of a phenol-resorcinol-formaldehyde resin as in Test 1*b* above were admixed with furfural and paraformaldehyde in the amounts shown in the Table below, and the resin product tested as hereinbefore described.

TABLE VII

| Test | Furfural Parts by Wt. | Paraformaldehyde Parts by Wt. | Burns | Smokes | Brittle | Cracks |
|---|---|---|---|---|---|---|
| 4 | 14.5 | 1.0 | no | no | no | no |
| 5 | 13.5 | 1.5 | no | no | no | no |
| 6 | 20.0 | 10.0 | no | no | no | no |
| 7 | 10.0 | 5.0 | no | no | no | no |
| 8 | 18.0 | 12.0 | no | no | no | some |

It can be seen that as to the resin per se, some cracking occurred where the paraformaldehyde exceeded 50% of the amount of furfural but that the other properties were good. In this instance, such cracking is reduced or eliminated where a glass laminate, for instance, is made with this resin.

EXAMPLE 13

A combination panel was made as in Example 6 and another as in Example 7, and these were laminated together to form a sandwich panel which was then placed in the ceiling of a Boeing 737 fuselage. A fire was purposely set within the fuselage with a clean burning fuel. Cabin temperatures rose to 900° F. Ceiling temperatures rose to 600° F. The panels neither ignited, smoked, nor disintegrated.

EXAMPLE 14

In a further series of tests according to the invention, 100 parts by weight of a phenol-resorcinol-formaldehyde resin were used in conjunction with a combination of aldehydes of this invention and used to produce a ten-inch diameter tube about 25-feet long. The tube was mounted in a stand. At one end a pan of heptane was placed, at the other end a fan was emplaced. The heptane was ignited and the fan used to suck the flame from the heptane into the tube. Temperatures in the vicinity of the flame impingement area were 1520° F., and the test conducted for a period of 15 minutes. The tube remained in place and did not deform or disintegrate; the flame did not progress down the tube. There was very little smoke. Witnesses in the immediate area of the test had no complaints as to the toxicity of the smoke or gases produced during the test. In comparable tests with polyesters and epoxies, halogenated or not, filled or not, and known as fire-retardant resins, the tubes ignite, burn from end to end, disintegrate and generally produce large volumes of dense black smoke.

In other variations of the present invention, there can be incorporated in the starting mixture a minor but effective amount, such as about the same amount as the amount of furfural or furfuryl alcohol, of a lower alkyl alcohol such as methanol or ethanol, or of glycerine or a polyhydric alcohol such as glycerine or a glycol such as polyethylene glycol or neopentyl glycol. These substances tend to enhance or increase corrosion resistance of the products according to this invention and at the same time do not have deleterious effects on such products. The following examples will demonstrate this embodiment of the invention, using furfural as a reactant. Similar results are obtainable when using furfuryl alcohol.

EXAMPLE 15

A phenol-resorcinol-formaldehyde resin consisting of 26 parts of phenol, 25 parts resorcinol and 17 parts of 50% formalin, together with 10 parts ethanol, to which was admixed 12 parts furfural and 3 parts paraformaldehyde. The whole was mixed for 2 minutes with a jiffy mixer, three layers of glass fabric were saturated with the mixture, and the same was placed in an oven for 1 hour at 200° F. The part cured to a tough, solid sheet which, when exposed to a butane torch did not burn nor discharge any appreciable smoke.

EXAMPLE 16(a)

A phenol-resorcinol-formaldehyde resin consisting of 26 parts of phenol to 16 parts resorcinol to which was added about 12 parts of polyethylene glycol; the same was admixed with 3 parts paraformaldehyde and 12 parts of furfural.

EXAMPLE 16(b)

As in Example 16(a), except that in lieu of polyethylene glycol, about the same quantity of neopentyl glycol was first dissolved at room temperature in the furfural and then the balance of the resin components were admixed.

EXAMPLE 16(c)

A combination of Examples 16(a) and 16(b) wherein both polyethylene glycol and neopentyl glycol were used in total amount about the same as the furfural as hereinbefore described; all parts being admixed.

The three formulations were baked in an oven for 1 hour at 200° F. Upon application of a propane torch, none of the samples materially burned or smoked.

The above specific description and examples have been given for purposes of illustration only and modifications and variations can be made therein without departing from the spirit and scope of the appended claims. In this specification and claims, parts and percentages are by weight unless otherwise indicated. The weights of paraformaldehyde and the furfural and furfuryl alcohol are percentages based on the weight of the resorcinol-providing component.

I claim:

1. A fire-resistive duct comprising wound glass filaments formed of rovings coated with a tough, fire-resistive resin exhibiting low flame spread and low smoke evolution under exposure to direct flame or to radient heat and being the reaction product of a partially cured resin of resorcinol, phenol and formalin, and paraformaldehyde and at least one substance chosen from the group consisting of furfural and furfuryl alcohol, said paraformaldehyde and said substance being added in amounts sufficient to provide said fire-resistive resin.

2. A shaped hollow article comprising wound glass filaments formed of rovings coated with a tough, fire-resistive resin exhibiting low flame spread and low smoke evolution under exposure to direct flame or to radiant heat and being the reaction product of a resorcinol component chosen from the group consisting of resorcinol, a mixture of phenol and resorcinol, and a partially cured resin of resorcinol, phenol and formalin, and paraformaldehyde, and at least one substance chosen from the group consisting of furfural and furfuryl alcohol, said paraformaldehyde and said substance being added in sufficient amount to provide such fire-resistive resin.

3. A construction panel comprising a laminate of glass cloth and a fire-resistive resin which is the reaction product of 100 parts by weight of an A component which is a partially cured resin of resorcinol, phenol, and formalin, and 30 parts by weight of a B component which consists essentially of 3 parts by weight paraformaldehyde and 12 parts by weight of furfural.

4. The panel of claim 3 suitable for use in the interior of an airplane.

5. An article of manufacture comprising a glass fiber base impregnated with a fire-resistive resin exhibiting low flame spread and low smoke evolution under exposure to high temperatures and being the reaction product of a resorcinol component chosen from the group consisting of resorcinol, a mixture of resorcinol and phenol, and a partially cured resin of resorcinol, phenol and formalin, and paraformaldehyde plus at least one substance chosen from the group consisting of furfural and furfuryl alcohol, said paraformaldehyde and said substance being added in sufficient amounts to provide such fire-resistive resin.

6. A method of making a fire-resistive shaped product including tanks, ducts and pipes, which comprises:
   (1) coating glass roving with an admixture consisting essentially of: (a) a resorcinol component chosen from the group consisting of resorcinol, a mixture of resorcinol and phenol, and a partially cured resin of resorcinol, phenol and formalin, (b) paraformaldehyde, plus, (c) at least one substance chosen from the group consisting of furfuraldehyde and furfuryl alcohol, (d) said paraformaldehyde and said substance being each added in an amount sufficient to produce with said resorcinol component a tough, fire-resistive resin,
   (2) forming filaments of such coated roving,
   (3) winding said filaments on a form or mold to produce a shaped product,
   (4) curing to form of said admixture a tough, fire-resistive resin exhibiting low flame spread, good heat release and low smoke evolution when exposed to direct flame or to radiant heat and being resistant to embrittlement and cracking upon curing, and
   (5) removing said cured product from said form or mold.

7. Method as in claim 26 wherein said resorcinol component is a partially cured resin of resorcinol, phenol and formalin.

8. Method as in claim 6 wherein said fire-resistive resin is the reaction product of a partially cured resin of 26 parts by weight phenol, 16 parts by weight resorcinol and 15-35 parts by weight formalin, 3 parts by weight paraformaldehyde, and 12 parts by weight furfural.

9. The method of making a fire-resistive duct which comprises coating glass roving with an admixture consisting essentially of:
   (a) a partially cured resin of phenol, resorcinol and formalin,
   (b) paraformaldehyde, and
   (c) at least one second substance chosen from the group consisting of furfural and furfuryl alcohol,
   (d) said paraformaldehyde and said second substance being added in sufficient amounts to produce a tough, fire-resistive resin,
   forming filaments of such coated roving,
   spiral winding said filaments to form said duct and allowing said coating to cure to form a tough, fire-resistive resin exhibiting low flame spread, good heat release and low smoke evolution when exposed to direct flame or to radiant heat and being resistant to embrittlement and cracking upon curing.

10. A method of making a fire-resistive shaped product which comprises:

(1) incorporating a reinforcing agent in an admixture consisting essentially of: (a) a resorcinol component chosen from the group consisting of resorcinol, a mixture of resorcinol and phenol, and a partially cured resin or resorcinol, phenol and formalin, (b) paraformaldehyde and (c) at least one substance chosen from the group consisting of furfural and furfuryl alcohol, (d) said paraformaldehyde and said substance being added in amounts sufficient to provide said fire-resistive resin, (2) forming such incorporated agent and resin into a desired shape, and (3) curing to form of said admixture a fire-resistive resin exhibiting low flame spread, good heat release and low smoke evolution when exposed to direct flame or to radiant heat and being resistant to embrittlement and cracking upon curing.

UNITED STATES PATENT AND TRADEMARK OFFICE
CERTIFICATE OF CORRECTION

PATENT NO. : 4,076,873
DATED : February 28, 1978
INVENTOR(S) : Lawrence E. Shea

It is certified that error appears in the above-identified patent and that said Letters Patent are hereby corrected as shown below:

Item [60] Related U. S. Application Data,
"Jun. 1, 1977" should read --Jun. 1, 1976--.

Column 1, line 8, "1977" should read --1976--.

Column 10, Table I (continued) 6th column headed "Furfuraldehyde", item 11, "0" should read --10--.

Column 11, line 21, after "ASTM" delete the period.

Column 11, line 21, "nonetheless, as" should read -- nonetheless, an--.

Column 13, line 6, "extinguishes" should read --extinguished--.

Column 16, line 42, "claim 26" should read --claim 6--.

Signed and Sealed this

Fifteenth Day of August 1978

[SEAL]

Attest:

RUTH C. MASON
Attesting Officer

DONALD W. BANNER
Commissioner of Patents and Trademarks